(12) United States Patent
Artis (10) Patent No.: US 8,442,912 B2
(45) Date of Patent: May 14, 2013

(54) METHOD AND SYSTEM FOR FACILITATING CREATION AND PROMOTION OF CREATIVE WORKS

(76) Inventor: Kenneth J. Artis, Tomah, WI (US)

( * ) Notice: Subject to any disclaimer, the term of this patent is extended or adjusted under 35 U.S.C. 154(b) by 1679 days.

(21) Appl. No.: 10/678,390

(22) Filed: Oct. 3, 2003

(65) Prior Publication Data

US 2005/0075956 A1  Apr. 7, 2005

(51) Int. Cl.
*G06Q 40/00* (2006.01)

(52) U.S. Cl.
USPC ............................................. 705/40; 705/36

(58) Field of Classification Search .................. None
See application file for complete search history.

(56) References Cited

U.S. PATENT DOCUMENTS

| | | | |
|---|---|---|---|
| 6,792,411 B1 * | 9/2004 | Massey, Jr. ...................... | 705/35 |
| 7,003,493 B2 * | 2/2006 | Weichert et al. ................. | 705/39 |
| 2002/0198763 A1 * | 12/2002 | Pittelli ............................ | 705/10 |
| 2004/0015427 A1 * | 1/2004 | Camelio ......................... | 705/35 |

OTHER PUBLICATIONS

John Kelsey & Bruce Schneier, "Electronic Commerce and the Street Performer Protocol", Published 1998, pp. 1-9.*
John Kelsey, "Electronic Commerce and the Street Performer Protocol", Counterpane Systems, pp. 1-9.*
Website printouts from www.idealist.org, dated 1995-2003.
Website printouts from www.greatergood.com, dated 2000-2002.
Website printouts from www.civilian.com, Jul. 30, 2003.

* cited by examiner

*Primary Examiner* — Charles Kyle
*Assistant Examiner* — Jennifer Liu
(74) *Attorney, Agent, or Firm* — Irell & Manella LLP (57) ABSTRACT

A method and system for facilitating the creation and promotion of creative works involves displaying or providing information about one or more undeveloped creative works, and receiving and processing requests for purchases of benefits relating to selected ones of the undeveloped creative works. Patron information is stored in a manner associated it with work under development selected by the user. Monetary amounts received from patrons relating to the undeveloped works are aggregated and, at a certain point, made available to the producer of the work to be developed. Patrons may be notified concerning availability of the selected and previously purchased benefits relating to the patron's sponsorship of the particular work. The benefit may be redeemed or obtained in a variety of different manners, depending upon the nature of the benefit.

26 Claims, 6 Drawing Sheets

FIG. 1

PATRON™

*YOUR BEST OPPORTUNITY TO CHOOSE YOUR CHOICE*

300

305

*BECOME A SPONSOR*

PATRON™ is the place where you will find out about the future. It's your opportunity no not only learn about what is being created for films, television, radio, music, theater, dance, the visual arts, fiction, and not fiction, but to participate in their creation. Plus, you will receive one or more unique benefits. You can do it very easily. Here's how....

First, what is your interest? Is it:

- Film
- Television
- Radio
- Music
- Theater
- Dance
- Visual Arts
- Fiction
- Non - Fiction

308

Highlight your interest to learn more.

310

*ALREADY A SPONSOR?*

If you have already made your choice and have sponsored a creative work, you can check-in to:

- Learn about its progress;
- Provide your input;
- Find out about the availability of your benefit(s)...

By clicking here:

|X|

FIG. 3

WELCOME TO FILM

PATRON™ *offers the following selections¹ for your sponsorship:*

PLAYS & PLAYERS - A true love story brought to the screen by Nels Larson, the Ingmar Bergman of ironic comedy, an independent film about two nineteen year olds who become involved with each other, by chance, while students attending a large impersonal university. This film is slated to star Rena Thomas and Harry Cannon, with Benita Franklin, Mattie Farrington, and Stan Packard.

OIGA - A Spanish drama, with subtitles, about a burglar who must grapple with is conscience after stealing and fencing a valuable violin that he, unknowingly, stole from the home of a young talented blind violinist. Cast as yet not determined.

COYOTE BEAUTIFUL - An independent film by noted film maker, Mars Alexander. A western of the old school that revolves around the varying concepts of justice, how they merge, how they are in conflict, how they vanish and reappear to suit the moment. Slated to star Lee Rosen and Naomi Winter.

DON'T - A film for the seeker of suspense. Chad Hyatt portrays the man next door, who is also the man who should never enter your life. He is a diabolical serial killer who outwits nearly everyone but an equally diabolical detective played by Jane Stanley.

If you are interested in sponsoring one of the films offered, just click on the film that interests you to learn more about it. To return to this page, hit the Back Arrow to learn about other films. ...

SPONSOR BENEFITS

You have selected COYOTE BEAUTIFUL. The following benefits are available for your purchase:

503 {
- DVD of finished film
- Set of production photos
- CD of music from film
- Crew T - Shirt
- Collector Mug
- Lobby Poster
}

*What do you receive when you purchase a benefit for Two Dollars ($2.00), which goes toward the production of the film is to support the creative work. In return, you receive a discount on the merchandise when the film is released. For example, the civilian price of the DVD will be approximately Twenty One Dollars ($21.00), the price to you, a sponsor, will be Nine Dollars ($9.00)*

*Other discounts are as follows:*  [information listed here]

*To select a benefit for purchase, click on the benefit.*

*NOTE: You may purchase more than one benefit per creative work. If the creative work is not produced, you may either select a benefit from another creative work offered through PATRON™ or request a full refund of your funds.*

Benefit Purchase Process:

- Name :
- Address :
- e – mail :
- 605 telephone :
- Payment Method
- Password & Repeat of Password :

We will keep you posted of the Work's progress via e-mail.

NOW...

You are more than a spectator, a part of the audience. You are a participant in the creation of a new work. Because of your support a film is going to be produced, shown, and enjoyed. As a way of acknowledging you, PATRON™ and the creator of the work would like to include your name in the list of Patrons for [COYOTE BEAUTIFUL]. You will be listed on a website dedicated to recognizing all those who have participated in the creation of this film. Also, you may be listed in the credits on your copy of the DVD that you are able to purchase through PATRON™

If you do not wish to be acknowledged, please check here:
[X]

METHOD AND SYSTEM FOR FACILITATING CREATION AND PROMOTION OF CREATIVE WORKS

BACKGROUND OF THE INVENTION

1. Field of the Invention

The field of the present invention generally relates to systems and methods for facilitating the creation and promotion of creative works.

2. Background

Creators, authors, producers, and promoters of creative works, (hereinafter "creator" or "creators" for convenience) often have limited means by which to support the production of creative works, such as motion pictures, television productions, radio productions, audio and/or video productions, live (e.g., stage) productions, works of art, or works of literature, to name a few. For example, a limited number of large studios or production companies are involved in a high percentage of motion picture projects. This situation not only limits the availability of capital and support for aspiring motion picture artists and producers, but it also may place serious constraints on the creator's artistic freedom. Similar situations exist, to varying degrees, in other fields of artistic and creative endeavor.

At the same time, the public, which is the intended audience for most creative works, has little meaningful participation in the creation of such works. Indeed, the public's interest in a particular subject matter may not be reflected in the nature of the works selected by large production studios, publishers, and other traditional sources of selecting, capitalizing and supporting creative works. The public also generally lacks meaningful exposure to the ongoing progress of creative works, except perhaps in the relatively limited form of pre-release advertising via television or radio commercials, billboards, movie trailers, etc.

It would therefore be advantageous to provide a system and method to facilitate the creation and promotion of creative works. It would further be advantageous to increase the potential for the public to participate in the selection and support of creative works yet to be produced, and to obtain newsworthy information relating to the progress of development thereof.

SUMMARY

The invention in one aspect relates generally to facilitating the creation and promotion of creative works.

In one embodiment, a method or system for facilitating the creation and promotion of creative works involves means for, or the steps of, displaying or otherwise providing information about one or more undeveloped creative works, and receiving and processing requests for purchases of benefits relating to selected ones of the undeveloped creative works. Patron information is stored in a manner associating it with work under development selected by the user. Monetary amounts received from patrons relating to the undeveloped works are aggregated and, at a certain point, made available to the producer of the work to be developed. Patrons may be notified concerning availability of the selected and previously purchased benefits relating to the patron's sponsorship of the particular work. The benefit may be redeemed or obtained in a variety of different manners, depending upon the nature of the benefit.

Further embodiments, variations and modifications are also disclosed herein.

BRIEF DESCRIPTION OF THE DRAWINGS

FIGS. 3, 4, 5 and 6 are examples of screen images as may be employed in one or more embodiments of a system for facilitating the creation and promotion of creative works as disclosed herein.

DETAILED DESCRIPTION OF PREFERRED EMBODIMENTS

According to one or more embodiments as disclosed herein, a system and method is provided for facilitating the creation and promotion of creative works. A creator, author, producer, or promoter of creative works (or other endeavors having an audience or consumer group) may, among other things, access tangible support for the creation and promotion of the creative works. Individuals, groups, or other entities can support the creation and promotion of creative works through the advance purchase of a benefit, examples of which are described hereinafter. An intermediary provides the service of channeling funds from patrons to creators of the works, and of distributing, managing and redeeming patrons' rights to benefits received as a result of supporting the creative works.

In one embodiment, for example, a computerized system is employed to provide a front-end interface for patrons seeking to support the creation and promotion of creative works, an administrative interface for adding, modifying and deleting information relating to one or more creative works available for support and promotion, and, optionally, a mechanism for disbursement of funds collected from patrons supporting the creative works.

As an example of operation, a creator may seek to have a creative work made accessible to prospective patrons, by being displayed via the computerized system. The computerized system serves as an intermediary between patrons and the creators of the works who are seeking tangible support and/or promotion of the creative work. The operator of the computerized system may or may not be affiliated with the creator(s). The operator of the computerized system may take a role in determining the suitability of the proposed creative work for support and promotion, or may simply allow any creators so desiring to utilize the computerized system, via, e.g., an automated interface providing the necessary functionality. The operator may negotiate or pre-establish a payment amount or commission in exchange for allowing creators to utilize the computerized system to facilitate funding and promotion of their creative works. Assuming the proposed creative work is accepted (to the extent such approval is necessary), information regarding the proposed creative work is posted in a publicly accessible manner on the computerized system. For example, the information may be placed on a website that is managed by the computerized system, or else may be downloaded to remote computerized machines which allow interaction by consumers.

Once information concerning the proposed creative work is posted in a publicly accessible manner on the computerized system, prospective patrons may view the information by any appropriate means. For example, prospective patrons may use a browser program to view web pages containing the information served from the website managed by the computerized system. Alternatively, if applicable, prospective patrons may interact with a remote computer or machine having the information locally stored thereon. The information posted may describe the general nature of the creative work and may, if applicable to the particular creative work, include information concerning plot lines, characters, and so on, in any level of detail deemed suitable by the creator. The information may also include audio and/or video elements, including, e.g., still pictures (such as, e.g., JPEG files), audio tracks (such as, e.g., MP3 files), and/or audio-visual presentations (such as, e.g., MPEG or .WAV files)—again depending upon the nature of the particular creative work. Prospective patrons are preferably provided with the ability to browse through a number of different proposed creative works, each of which is associated with a request for support. The computerized system may also make available information from past successfully produced creative works, to enhance credibility of the operator, creator, or overall approach to supporting creative works. The prospective patron is preferably provided with an opportunity to support the proposed creative work by pre-purchasing a benefit, which may be redeemed at a later time.

More specifically, the prospective patron is preferably provided with the opportunity to purchase something of value—a benefit, in the form of, e.g., a good or service, or a discount on thereon—with a portion (perhaps all) of the proceeds from the patron's purchase being utilized to fund and support the proposed creative work. For example, the patron may pre-purchase a copy of the as-yet undeveloped creative work itself, or a discount thereon, or may pre-purchase or purchase another related or unrelated creative work, or a discount thereon. Alternatively, the patron may pre-purchase merchandise, or a discount, related to the creative work or another creative work.

When benefits are pre-purchased, the computerized system allows creators to collect and have access to funds which may be utilized in the creation and promotion of the undeveloped creative work. The benefits are provided at a later time; for example, when the creative work is completed copies of it, or merchandise related to it, may be made available for redemption by the patrons, depending upon the nature of the prescribed benefit. Alternatively, the patron may obtain a copy of, or merchandise relating to, a different (related or unrelated) creative work.

To facilitate redemption, the computerized system preferably maintains records relating to purchased or pre-purchased benefits, and such records are preferably of a nature so as to enable ready identification of the patrons, and communication therewith if necessary. Purchase orders received from patrons may, for example, identify the name of the creative work, the name of the patron, an email address of the patron (and/or other contact information such as telephone number, address, etc.), and a credit or debit card account number (or other financial transaction information such as e-purse transfer amount) against which the purchase may be charged. After the purchase is recorded at the computerized system and payment confirmed, a receipt confirming the transaction may be sent to the patron (via email or otherwise). If the transaction is not completed for any reason, the patron may be notified of that fact.

All payments received by the computerized system are preferably placed into a special (e.g., escrow) account specifically designated for the creative work. As noted, electronic records are maintained by the operator of all patrons, the amount of the purchase, the benefit purchased, and other such information as may be needed to identify the patron at the time the benefit becomes available.

During the course of the creation and development of the creative work, the creator may post progress reports and such other newsworthy information about the creative work for review by the patron. Such information may be posted at the website and made available for review by the patron, or else may be electronically disseminated to the patrons via, e.g., email. The information may include, for example, pictures of the creative work, interviews with the participants (e.g., actors, directors, etc.) involved in creation of the creative work, audio or visual presentations relating to the creative work, or even promotions relating to a different undeveloped creative work. Upon completion of the creative work, the patrons are notified (preferably via email). At an appropriate time, before or after completion of the creative work, the patrons are also notified regarding how to redeem the benefit, if not yet redeemed.

In the event that a proposed creative work does not attract sufficient support (e.g., funds) as a result of benefit purchases or pre-purchases by patrons, the creator and/or operator may, if appropriate, solicit funds from conventional sources to fund the gap between benefits purchases/pre-purchases and the amount needed to produce the creative work. Alternatively, the creator and/or operator may offer patrons a benefit relating to a different creative work, or the patron may request, and receive, a full refund of the purchase price of the benefit(s). These alternatives are also available if the work is not produced for any reason.

Figure 1:
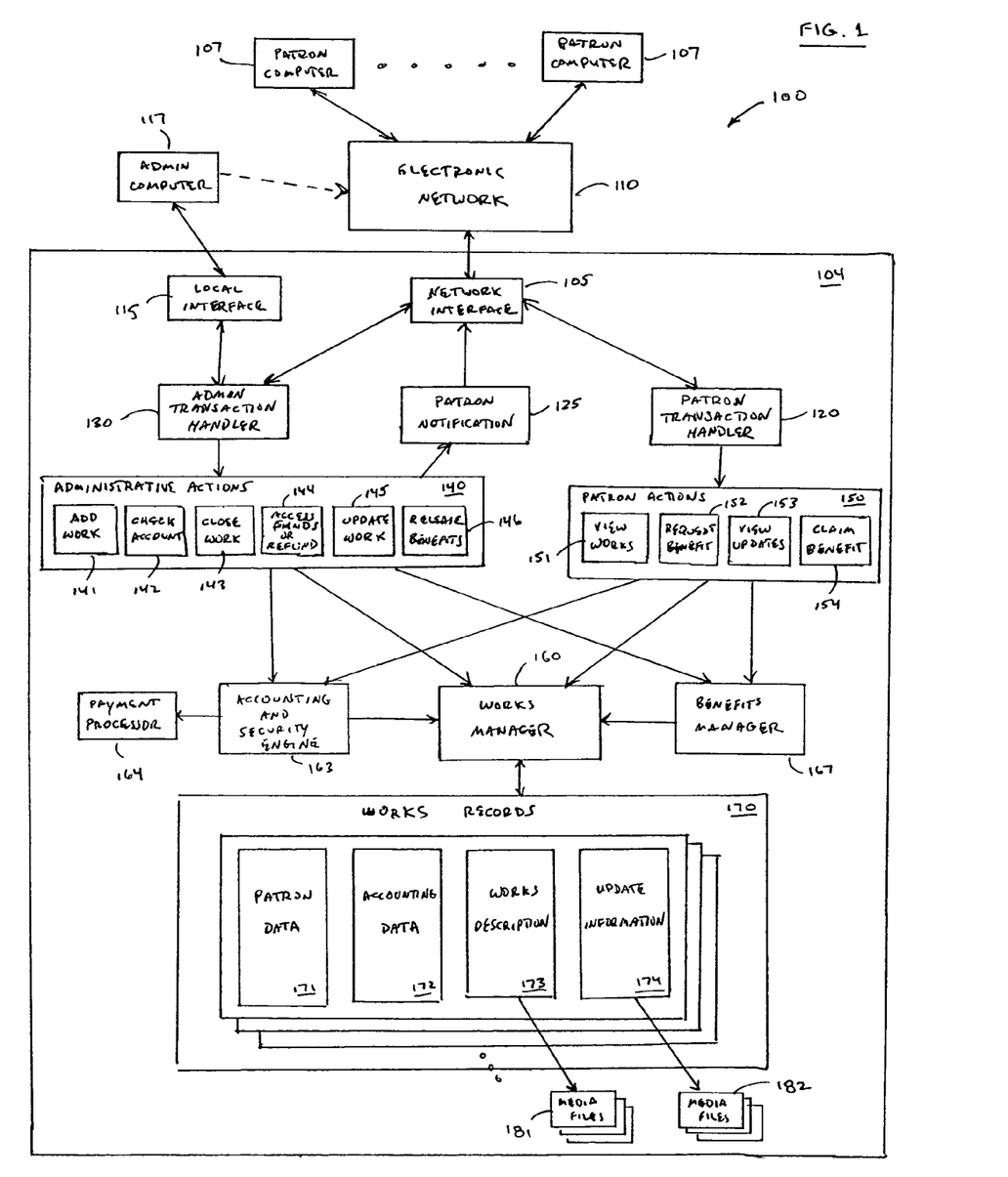
FIG. 1 is a top-level functional diagram of a system for facilitating the creation and promotion of creative works in accordance with one embodiment as disclosed herein.

FIG. 1 is a top-level functional diagram of a computerized system 100 for facilitating the creation and promotion of creative works in accordance with one embodiment as disclosed herein. As shown in FIG. 1, the computerized system 100 includes a main computer system 104 (which may itself be a network of computers) having an electronic interface 105 for interacting with remote computer devices 107 over a distributed electronic network 110. In one embodiment, the distributed electronic network 110 comprises the Internet (and/or other interconnected electronic networks, whether digital, analog or mixed in nature), the electronic network interface 105 comprises a server or the equivalent, and the remote computer devices 107 execute a software browser program (such as, e.g., Microsoft Internet Explorer® or Netscape Navigator®) for interacting with the main computer system 104 via the distributed electronic network 110 and electronic network interface 105.

The elements of the computerized system 100 shown in FIG. 1, and, in particular, of main computer system 104, are meant to illustrate the functional components of a preferred embodiment. They are not meant to imply or require a specific software architecture, functional division, hierarchy, or ordering. Those skilled in the art will appreciate that the functional elements of main computer system 104 can be implemented and organized in a variety of different ways without departing from the scope and spirit of this disclosure.

As further illustrated in FIG. 1, the electronic network interface 105 may interact with a variety of functional components of the main computer system 104, and, in particular, with a patron transaction handler 120 and an administrative transaction handler 130, both of which may be embodied as software instructions which are executable by one or more processors. As described in more detail hereinafter, the patron transaction handler 120 preferably conveys information, via the distributed electronic network 110, to the remote computer devices 107 for presentation thereon concerning one or more undeveloped creative works, and receives and facilitates processing of requests received from the remote computer devices 107 for purchasing benefits relating to the undeveloped creative works. The administrative transaction handler 130 preferably facilitates creation or addition of information relating to new undeveloped creative works or existing partially developed creative works, the disbursement of monetary amounts collected for specific creative works, and initiating the dissemination of benefits to users having purchased benefits relating to the creative works.

In the particular embodiment illustrated. in FIG. 1, the patron transaction handler 120 is adapted to exchange information with the remote computer devices 107 so as to permit an interactive user session. The patron transaction handler 120 may, for example, allow a patron to engage in any of a number of different available actions including, in the present example of FIG. 1, viewing works, requesting a benefit, viewing updates, or claiming a benefit, each of which will be described in more detail hereinafter. Likewise, the administrative transaction handler 130 may allow an administrator, operator, creator, or other individual having appropriate permission to engage in any of a number of different available actions including, in the present example of FIG. 1, adding new works, closing a work, checking an account associated with a work, accessing funds or providing a refund, updating a work, and releasing benefits to patrons, each of which will be described in more detail hereinafter.

The main computer system 104 preferably maintains data records 170 pertaining to works which are presented to patrons for their prospective patronage. The works data records 170 may be organized in one or more databases, either centralized or distributed, and may contain any information necessary to serve the functions of the overall system. In the example of FIG. 1, the works data records 170 include patron data 171, accounting data 172, works descriptions 173, and update information 174, the nature of each of which will be described in more detail hereinafter. The works data records 170 may be managed by a works manager 160 which receives requests to access, add to, or modify the information in the various works data records 170 from other system components such as, e.g., the administrative transaction handler 130 or the patron transaction handler 120.

In the example of FIG. 1, additional functional system components are provided to perform various housekeeping tasks. For example, an accounting and security engine 163 may be provided to manage the financial aspects of the system and ensure the integrity of transactions having a financial nature, such as the receipt of monetary amounts from patrons or the access to accrued credit or monies by creators. A benefits manager 167 may be provided to manage the redemption of benefits by patrons after the benefits are released.

Further operational details of the computerized system 100 will now be described. In typical operation, it is anticipated that creators, or system operators, or administrators, upon deciding to do so, will be enabled to add new works to the main computer system 100 via a front-end interface to facilitate such an operation, although an administrative front-end interface is not required, merely a convenience. A creator, system operator, or administrator may utilize an administrative computer 117 which may comprise, e.g., a standard personal computer, workstation, or terminal. The administrative computer 117 may be part of a local network and thus may connect to the main computer system 104 via a local interface 115, or else may be a remote computer and connect to the main computer system 104 over an electronic network 110 and via network interface 105.

In either case, the creator, system operator, or administrator may log on to the main computer system 104, or otherwise gain access thereto, using any appropriate technique as is well known in the art. The creator, system operator, or administrator will be recognized as such and routed to an administrative transaction handler 130. The administrative transaction handler 130 will then permit the creator, system operator, or administrator to post works or perform other related actions. The various selections available to the creator, system operator, or administrator may be presented in any suitable format or manner, according to the preference of the system designer. For example, the selections may be presented in single- or multi-level menu format, or in any other desired format or manner.

The administrative transaction handler 130 in the example of FIG. 1 includes a particular selection, add work 141, allowing the creator, system operator, or administrator to post new works to the main computer system 104 for viewing and prospective sponsorship by patrons. The add work 141 selection may invoke an interactive software routine facilitating the posting of a new work to the main computer system 104. In such an embodiment, the interactive software routine invoked by the add work 141 selection may, for example, allow the creator, system operator, or administrator to create a new data record to be added to the works data records 170, via the works manager 160. In connection with the creation of a new data record, the creator, system operator, or administrator may provide any necessary or desired information pertaining to the new work. Such information may include, for example, a name for the new work, a textual description of the new work, digital images relating to the new work, audio or video material relating to the new work, and so on. The creator, system operator, or administrator may be permitted to upload files which become associated with the new work as part of the works data records 170. For example, the add work 141 selection may permit the creator, system operator, or administrator to upload or create a web page which may be intended for display to patrons, or to upload text, image, audio, or video files to be associated with the new work, which may be stored, if desired, as media files 181 associated with the new work. The creator, system operator, or administrator will also generally provide information concerning the benefit available to prospective patrons for sponsoring the work. Specific examples of possible benefits are described elsewhere herein. The information pertaining to a new work may be added in a single session, or may, if desired, be added piecemeal over several sessions. If the creator, system operator, or administrator is satisfied with the addition of the new work, approval may be given for its activation on the main computer system 104, allowing it to be made available to prospective patrons for sponsorship.

The creator, system operator, or administrator may also optionally enter a target sponsorship level (i.e., target monetary amount). When the target is reached, the creator, system operator, or administrator may be automatically notified by the main computer system 104.

In connection with the creation of a new data record associated with the work, the works manager 160 may create a data structure which will permit the later association of additional information with the new work. For example, the works manager 160 may create a data structure which will serve later to store patron data, accounting data, and update information, all associated in some fashion with the new work being added.

Once a new work has been added and, if necessary, approved, it becomes available to prospective patrons for sponsorship. In the example of FIG. 1, patrons may access and view information relating to works for sponsorship using patron computers 107 to access the main computer system 104. The patron computers 107 may be any type of computerized devices capable of communicating and interacting with the main computer system 104. For example, the patron computers 107 may be standard personal computers or workstations, handheld computer devices (such as personal digital assistants with remote communication capability), telephonic devices (such as web phones) supporting multi-media communication, and so on. In a typical scenario, the patron computer 107 will comprise a personal computer outfitted with a web browser program, and will connect to the main computer system 104 via an electronic network 110 such as the Internet.

When a patron accesses the main computer system 104, the patron transaction handler 120 will be invoked to manage the session. The patron transaction handler 120, as previously noted, may permit patrons to carry out any of a number of various actions. With respect to new works, however, the primary actions available will be to view the works, and to request a benefit (i.e., to sponsor the work). To this end, the patron may select the view works 151 selection provided by the patron transaction handler 120. As with the administrative transaction handler 130, the patron transaction handler 120 may present the various selections available to the patron in any suitable format or manner, according to the preference of the system designer—for example, in single- or multi-level menu format, or in any other desired format or manner. A great deal of flexibility is possible with the presentation of patron selections. The patron transaction handler 120 may, for example, present a list of works available for sponsorship, along with, if desired, material relating to each of the works (such as a brief textual description and/or one or more images or other data relating thereto). The listing may be in any desired order, such as most recent works first, or in any other desired order. Also, the works may be grouped according to type (i.e., motion picture works, audio works, literary works, etc.), or by any other desired categorization.

The patron transaction handler 120 preferably allows the prospective patron to browse among the various works available for sponsorship. For example, the patron may select (via, e.g., a hotlink or interactive button or icon) a particular new work of interest to view additional details pertaining thereto. The patron may then be presented with one or more additional screens of information. If applicable, the works manager 160 will retrieve any media files 181 associated with the particular work, for presentation to the patron. The patron may thereby become informed as to the specifics of the intended nature of the particular work. For example, if the new work is a motion picture to be produced, the patron may be enabled to read a description concerning the proposed motion picture, view sketches or images of scenes planned for the motion picture or of the creator's past work, view a video showing a rendition of an anticipated scene in the proposed motion picture, view images or biographical information concerning actors proposed for inclusion in the motion picture, and so on, all of which may generally be retrieved from the works data records 170 or may be linked thereto. The information presented to the prospective patron may also have hotlinks to other information sources relevant to the new work—for example, a website or web page devoted to a particular actor proposed for the motion picture, or a production company involved with the motion picture.

The information presented to a prospective patron also generally will include the nature of the benefit to be provided in return for sponsorship of the work by purchase of a benefit and the amount of sponsorship (e.g., monetary amount) required. In some instances, different benefits will be available depending upon the amount of sponsorship. If the patron desires to sponsor the work, then the patron may utilize the request benefit 152 selection, which may invoke a software routine for handling the acquisition of the requisite monetary amount from the patron and obtaining sufficient identifying information regarding the patron. According to one example, the interactive software routine causes a web page form to be served to the patron computer 107, thereby allowing the patron to provide any necessary identifying information. Such information may include, e.g., the patron name or pseudonym, email address, home or business address, telephone number, and any other information that may be useful in identifying the patron at a later time. The patron may optionally be asked to select a password or similar code to facilitate identification at a later time.

The interactive software routine triggered by the selection of the request benefit 152 option also preferably handles the receipt of the requisite monetary amount from the patron. To this end, the interactive software routine may invoke a payment processor 164, via the accounting and security engine 163, which functions to receive and process a monetary payment from the patron. The payment processor 164 may support any method of payment deemed suitable by the operator of the main computer system 104. For example, the payment processor 164 may permit payment by credit card, debit card, smart card, e-purse, or any other available means. Upon confirmation of the completed transaction by the payment processor 164, the accounting and security engine 163 may facilitate addition of the patron's information to the patron data 171 for the works record associated with the particular work being sponsored by the patron. At the same time, the patron transaction handler 120 may be informed of the successfully completed transaction, and may inform the patron that he or she has been accepted as a patron for the particular work. The patron transaction handler 120 may also, or subsequently, provide information as to the future redemption of the benefit purchased by the patron.

FIGS. 3 through 6 are screen images as may be presented to users interacting with the main computer system 104 at different points of the above-described process. FIG. 3, for example, illustrates an example of a screen image 300 as may be initially presented to users first connecting to the main computer system 104 via the computerized system 100. In FIG. 3, the screen image 300 is divided into two portions 305 and 310, the first portion 305 directed to allowing users to explore the possibility of becoming a sponsor of a creative work, and the second portion 310 directed to allowing existing sponsors to get updated about the work they are sponsoring and the availability of their pre-purchased benefits. Within the first portion 305, in this example, a listing of possible categories 308 of creative works is displayed, from which a prospective patron may choose. If the user is already a sponsor, then the user may be provided with a variety of options (e.g., learn about the sponsored work, provide user input, find out about the availability of pre-purchased benefits, etc.) from which the user may choose.

Figure 4:
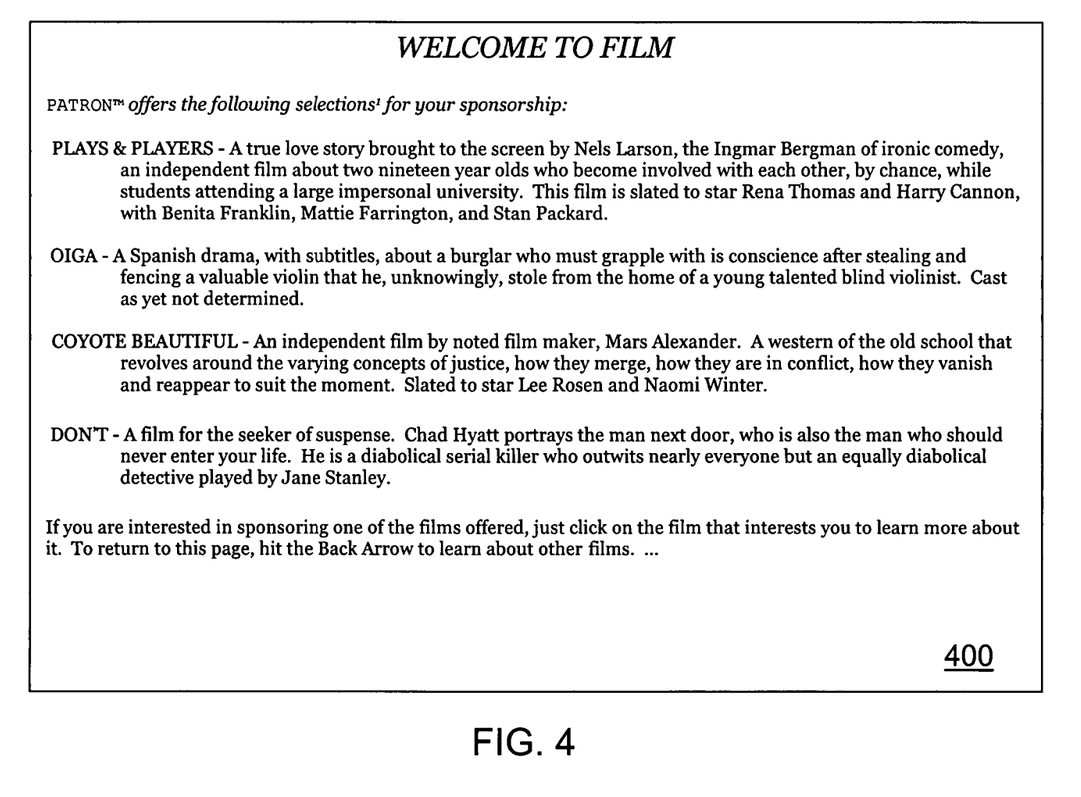
Figure 5:
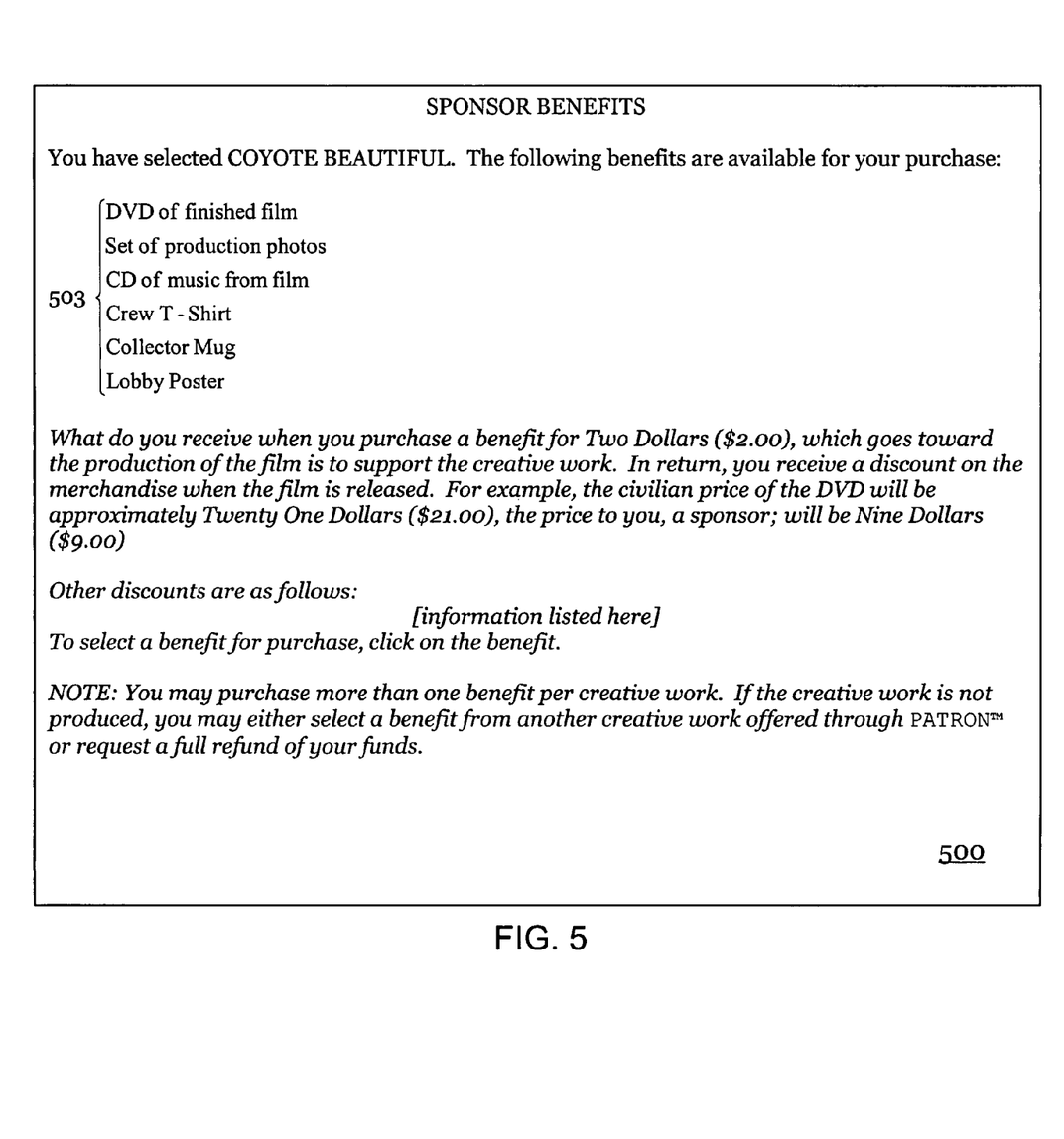

If the user is not yet a sponsor, the user will generally select one of the categories 308 of creative works to explore further. Selection in this context may be carried out via any interactive means, such as a mouse, keyboard, voice input, etc., at the patron computer 107. Selecting one of the categories 308 may result in the user being presented with a list of creative works for potential sponsorship along with summaries or other information pertaining to the creative works. An example of a screen image 400 listing a variety of films for potential sponsorship is illustrated in FIG. 4. In the example of FIG. 4, four different creative works (films) are listed and described for potential sponsorship. Selecting any of the films in the list may result in presentation of another screen image 500 (see FIG. 5) to the potential patron, this one identifying the nature of the benefit, or benefits 503, available to sponsors of the creative work, along with further information concerning the sponsorship process.

Figure 6:
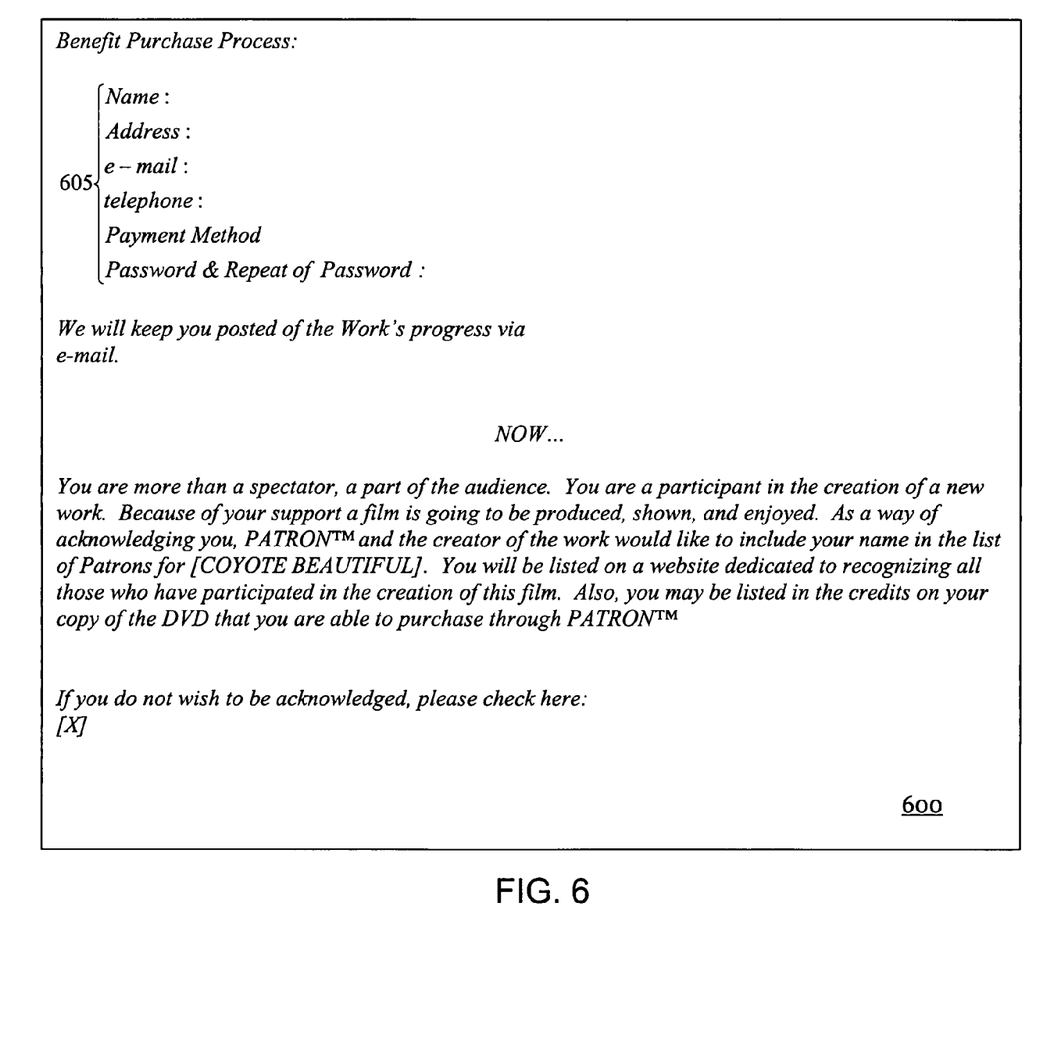

When the user selects one of the benefits 503, the user will generally purchase (or more accurately pre-purchase) the benefit through an automated process. The user may be presented with another screen image 600, as shown in FIG. 6, intended to capture certain data needed for an automated financial transaction and/or for future contact with the patron. The patron's sponsorship may also be made conditional upon the user's subsequent payment, via, e.g., a paper check mailed in by the user.

In certain embodiments, patrons may be given the option of sponsoring a work without acquiring a benefit, and/or may be given the option of increasing the monetary amount of sponsorship with or without additional benefit(s). Also, where multiple benefits are offered, potentially in connection with different levels of monetary sponsorship, the patron may need to choose one or more benefits from the information provided at the patron computer 107. Where multiple benefits are selected, the interactive software routine may be configured to transmit for display to the patron computer 107 a subtotal of the monetary amount of sponsorship required for the desired benefits. Where no benefit is desired but nevertheless a patron wishes to sponsor a work, the payment processor 164 may handle the monetary transaction as it ordinarily would, except that a special indication may be included in the patron data 171 so that the particular patron is excluded from redemption of any benefit.

The patron transaction handler 120 may be configured to allow a patron to sponsor multiple works in a single session. For convenience, once a patron has entered his or her contact or personal information, that information may be stored in a database in a manner allowing it to be conveniently retrieved by the main computer system 104 to be used in connection with sponsorship of further works, to avoid the need for the patron to re-enter contact or personal information thereafter.

With each added patron, or periodically, the accounting and security engine 163, or some other functional component of the main computer system 104, may update the total accrued monetary amount from patrons associated with a particular work. The updated monetary information may, for example, be stored as part of the accounting data 172 associated with the various works data records 170. The accounting data 172 may also, for example, include information pertaining to access to any portion of the accrued monetary amounts on a going forward basis. Monies collected via the computer system 104 may be placed in, e.g., an escrow account.

Eventually, as more patrons sponsor a particular work, the accrued monetary amount associated with that work will reach a desired target level. If a predefined target has been associated with a particular work, then when that target is reached the creator, system operator, or administrator may be automatically notified (e.g., via email or local message, as appropriate) by the main computer system 104. Progress reports may also be automatically transmitted to the creator, system operator, or administrator. Of course, the creator, system operator, or administrator may also manually view the accrued sponsorship associated with a given work; in the example of FIG. 1, this would be done using the check account 142 selection controlled by the administrative transaction handler 130. When the target is reached, the works manager 160 may be configured to "close" a particular work—that is, to no longer accept further patronage for that work. Alternatively, the creator, system operator, or administrator may access the main computer system 104 via the administrative transaction handler 130 and select the close work 143 option, either when the target is reached or at any time prior. It is not essential to close a work, in that the system may be configured to operate such that it continues to accept patronage after the target level is reached. However, the ability to close a work may be a convenient administrative mechanism.

Once a work is closed, or optionally prior to that time, the accrued funds become available to the creator for use in connection with the creative work. To access the accrued funds associated with a particular work, the creator (or a system administrator or operator acting on the creator's behalf) may access the main computer system 104 via the administrative transaction handler 130 and select the access funds or refund 144 selection. Preferably, release of funds is controlled by a security interface which prevents unauthorized access to the funds. The accounting and security engine 163 may be given the responsibility of ensuring that only authorized disbursements of the accrued funds are made. Access to the accrued funds may be accomplished in any of a wide variety of manners. It may be desirable, for instance, that the system administrator or operator, or an individual acting on their behalf, release funds manually from a separate account to the creator, and accordingly update the accounting data 172 in the data record associated with the particular work. In such an embodiment, the access funds or refund 144 selection may be used simply to notify the system administrator or operator of a desire to have the funds, or a portion thereof, released. Alternatively, the access funds or refund 144 selection may initiate an automated or semi-automated electronic transfer of funds, according to any of a variety of techniques as known in the art, for transferring all or a portion of the accrued funds to the creator's account. The creator may then use the transferred funds in connection with creation of the work.

The access funds or refund 144 selection may, in the present example, also be used to refund sponsorship monies received from patrons should the target sponsorship level not be reached, or if a decision is made not to pursue the work for whatever reason. A patron notification process 125 may be invoked to inform patrons of the decision not to pursue the work. Refunds may be accomplished by automatic credit transactions, direct payments to patrons, or by any other suitable means. The patron data 171 in the works data records 170 may be drawn upon in order to effectuate the refunds. Alternatively, a substitute benefit may be offered to some or all patrons, potentially in connection with a different work.

Once a work is underway, it may be desirable to allow patrons to view information relating to its development. To facilitate this capability, the administrative transaction handler 130 preferably provides an update work 145 option allowing a creator, system operator, or administrator to add new information relating to a work under development. The creator, system operator, or administrator is preferably provided with the capability of adding further information that will be logically linked with the existing information concerning the work under development. Such information might be a textual description of recent activities relating to development of the work, images of the work under development, audio and/or video tracks relating to the work under development, or other related or unrelated matter, including information about other proposed works.

The added update information 174 may be stored by the works manager 160 as part of the works data records 170. The update work 145 selection may provide the creator, system operator, or administrator with the ability to upload media files 182 which are logically linked to the data records for the work under development.

Patrons may be notified about the addition of any update information concerning a sponsored work via the patron notification process 125 which, as noted previously, may draw upon the patron data 171 in the works data records 170 to facilitate patron notification. Patrons may view the update information by connecting to the main computer system 104 and selecting, through the patron transaction handler 120, a view updates 153 option. Selection of the view updates 153 option causes the works manager 160 to retrieve the update information 174 associated with a specific sponsored work. Access to update information 174 may be limited to patrons who have actually sponsored a particular work, as opposed to, e.g., the general public. Access to update information may be perceived as a special benefit provided to patrons of a particular work. Prior to accessing the update information, verification of sponsorship of the particular work by the specific patron may be carried out by, e.g., the accounting and security engine 163, or some other process configured for this purpose, which can verify the specific patron's sponsorship of the work by accessing the patron data 171 associated with the work.

At some point, the creator may desire to allow release of benefits to the patrons. The release of benefits may await completion of the work under development, or it may occur prior to that time, at the discretion of the creator. To facilitate release of benefits to the patrons, the administrative transaction handler 130 of the main computer system 104 preferably includes a release benefits 146 option, by which a creator, system operator, or administrator may either initiate an automated or semi-automated release of benefits or else transmit authorization to release the benefits. The manner in which release of benefits is carried out may depend at least in part on the nature of the benefits. For a discount on merchandise, a coupon may be physically mailed or emailed to the patron. If the coupon is electronic in nature, it may, for example, be printed at a local printer by the patron (either at a patron computer 107 or a point-of-sale terminal, if applicable), or else redeemed in an e-commerce transaction provided that the online retailer supports such a feature. The coupon may be redeemable for a monetary discount, or alternatively for an item of merchandise at no additional cost.

If the benefit is in the form of a digital copy of the work or other digital merchandise (such as an audio data file, software program, etc.), then the benefit may be transmitted or otherwise downloaded to a patron computer 107. In such a case, the patron may be directed to a particular online site where the digital merchandise may be conveniently downloaded. Alternatively, the digital merchandise may be physically transported to the patron (e.g., by mail) on a portable medium, such as a CD, DVD, magnetic disk, etc.

Alternatively, the benefit may be obtained by the patron by visiting a particular store, warehouse, theme park, theater, or other location. In such a case, the patron may be notified by the main computer system 104 as to where to obtain the benefit. The patron notification process 125 may be responsible for notifying patrons not only of the fact that benefits are presently redeemable, but also of the location, if applicable, where the benefit may be received. As previously noted, the patron notification process 125 may draw upon the patron data 171 in the works data records 170 to facilitate notification of patrons concerning the availability of their benefit(s).

According to one embodiment, for example, a patron may access the main computer system 104 and select, through the patron transaction handler 120, a claim benefit 154 option in order to obtain, or to authorize release or transfer of, the previously purchased benefit. The claim benefit 154 option may provide the patron with the ability to directly receive the benefit electronically if it is in electronic form—e.g., a digital coupon, or digital data such as an audio file, video file, or computer program. Where the benefit is an item of merchandise, the claim benefit 154 option may allow the patron to initiate the delivery of the benefit to a specified address or location. The claim benefit 154 option may alternatively allow the patron to select a location where the benefit may be received or picked up.

As suggested above, the nature of the benefit which may be pre-purchased by patrons or otherwise provided thereto may vary depending upon the nature of the creative work. Examples of benefits available in connection with motion picture productions, for example, may include, e.g., a copy of the sponsored motion picture or a related motion picture (on any appropriate medium such as video tape, DVD, etc., or in any digital or other transmittable form) or a special version thereof (potentially with unique content and/or commentary), or a discount thereon; souvenirs or merchandise such as clothing, mugs, caps, key chains, posters, etc. relating to the motion picture or a related motion picture, or a discount thereon; tickets to a showing of the motion picture or a related motion picture, or a discount thereon; tickets to a studio or theme park, particularly one affiliated with the production of the motion picture, or a discount thereon; a copy of a soundtrack (on any appropriate medium such as CD, tape, etc., or in any digital or other transmittable form) associated with the motion picture or a related motion picture, or a discount thereon; or other merchandise or discounts offered by a sponsor of the motion picture or any company with which the creator or intermediary establishes a relationship for the purpose of providing benefits.

Examples of benefits available in connection with television productions may include, e.g., a copy of the television show or a related show (on any appropriate medium such as video tape, DVD, etc., or in any digital or other transmittable form) or special version thereof (potentially with unique content and/or commentary) or a discount thereon; souvenirs or merchandise such as clothing, mugs, caps, key chains, posters, etc. relating to the television show, or a discount thereon; tickets to a studio visit (for participation as part of a live studio audience or otherwise), or a discount thereon; tickets to a theme park, particularly one affiliated with the production of the television show, or a discount thereon; a copy of a soundtrack (on any appropriate medium such as CD, tape, etc., or in any digital or other transmittable form) associated with the television show, or a discount thereon; or other merchandise or discounts offered by a sponsor of the television show or any company with which the creator or intermediary establishes a relationship for the purpose of providing benefits.

Examples of benefits available in connection with radio productions may include, e.g., a copy of the final radio production (on any appropriate medium such as CD, tape, etc., or in any digital or other transmittable form) or a special version thereof (potentially with unique content and/or commentary), or a discount thereon; souvenirs or merchandise such as clothing, mugs, caps, key chains, posters, etc. relating to the radio production, or a discount thereon; tickets to the radio production or another production, or a discount thereon; tickets to a studio or theme park, particularly one affiliated with the production of the radio production, or a discount thereon; a copy of a soundtrack (on any appropriate medium such as CD, tape, etc., or in any digital or other transmittable form), or a discount thereon; or other merchandise or discounts offered by a sponsor of the motion picture or any company with which the creator or intermediary establishes a relationship for the purpose of providing benefits.

Examples of benefits available in connection with audio productions (for example, recorded musical works) may include, e.g., a copy of the audio production, album, soundtrack, etc. (on any appropriate medium such as CD, tape, etc., or in any digital or other transmittable form) or a special version thereof (potentially with unique content or musical tracks), or a discount thereon; souvenirs or merchandise such as clothing, mugs, caps, key chains, posters, etc. relating to the audio production or recording artist affiliated therewith, or a discount thereon; tickets to a concert by a recording artist affiliated with the audio production (if applicable) or another musical artist, or a discount on tickets; or other merchandise or discounts offered by a sponsor of the audio-visual production or any company with which the creator or intermediary establishes a relationship for the purpose of providing benefits.

Examples of benefits available in connection with audio-visual productions may include, e.g., a copy of the audio-visual production (on any appropriate medium such as video tape, DVD, etc., or in any digital or other transmittable form) or a special version thereof (potentially with unique content and/or commentary), or a discount thereon; souvenirs or merchandise such as clothing, mugs, caps, key chains, posters, etc. relating to the audio-visual production, or a discount thereon; tickets to the audio-visual production (if applicable) or another production, or a discount thereon; tickets to a studio or theme park, particularly one affiliated with the production of the audio-visual production, or a discount thereon; a copy of a soundtrack (on any appropriate medium such as CD, tape, etc., or in any digital or other transmittable form), if applicable, associated with the audio-visual production, or a discount thereon; or other merchandise or discounts offered by a sponsor of the audio-visual production or any company with which the creator or intermediary establishes a relationship for the purpose of providing benefits.

Examples of benefits available in connection with live productions (such as musicals, concerts, operas, plays, stage productions, etc.) may include, e.g., a recorded copy of the live production (on any appropriate medium such as video tape, DVD, etc., or in any digital or other transmittable form), potentially with added content and/or commentary, or a discount thereon; souvenirs or merchandise such as clothing, mugs, caps, key chains, posters, etc. relating to the live production, or a discount thereon; tickets to a showing of the live production or a discount thereon; tickets to a studio or theme park, or a discount thereon; a copy of a soundtrack (on any appropriate medium such as CD, tape, etc., or in any digital or other transmittable form) associated with the live production, or a discount thereon; or other merchandise or discounts offered by a sponsor of the live production or any company with which the creator or intermediary establishes a relationship for the purpose of providing benefits.

Examples of benefits available in connection with creation or production of works of art may include, e.g., a copy or reproduction of the original artwork (on any appropriate medium such as canvas, poster or lithographic media, photographic media, sculpted material, or images recorded or conveyed in any digital or other transmittable form) or any derivative works or limited editions thereof, or a discount thereon; souvenirs or merchandise such as clothing, mugs, caps, key chains, posters, programs, etc. relating to the work of art, or a discount thereon; tickets to art exhibits or a discount thereon; art books or other books, periodicals or published matter (on any appropriate medium including paper, CD-Rom, or in any digital or other transmittable form), or a discount thereon; or other merchandise or discounts offered by a sponsor of the work of art or any company with which the creator or intermediary establishes a relationship for the purpose of providing benefits.

Examples of benefits available in connection with creation or production of works of literature may include, e.g., a copy or reproduction of the original work (on any appropriate medium including paper, CD-Rom, or in any digital or other transmittable form) or any derivative works, limited or special/first editions, or original signed copies, or a discount on any of the foregoing; souvenirs or merchandise such as clothing, mugs, caps, key chains, posters, programs, etc. relating to the work of literature, or a discount thereon; other books, periodicals or published matter (on any appropriate medium including paper, CD-Rom, or in any digital or other transmittable form), or a discount thereon; or other merchandise or discounts offered by a sponsor of the work of literature or any company with which the creator or intermediary establishes a relationship for the purpose of providing benefits.

All of the foregoing are examples of types of benefits that may be offered or provided, but are by no means intended to be limiting. The nature of the benefits offered or provided may vary depending upon the resources of the parties involved and a variety of other factors. Generally, anything perceived to be of value to patrons may be deemed a benefit falling under the scope of the present disclosure. Moreover, more than one benefit or type of benefit may be offered to or made available for redemption by patrons.

Figure 2:
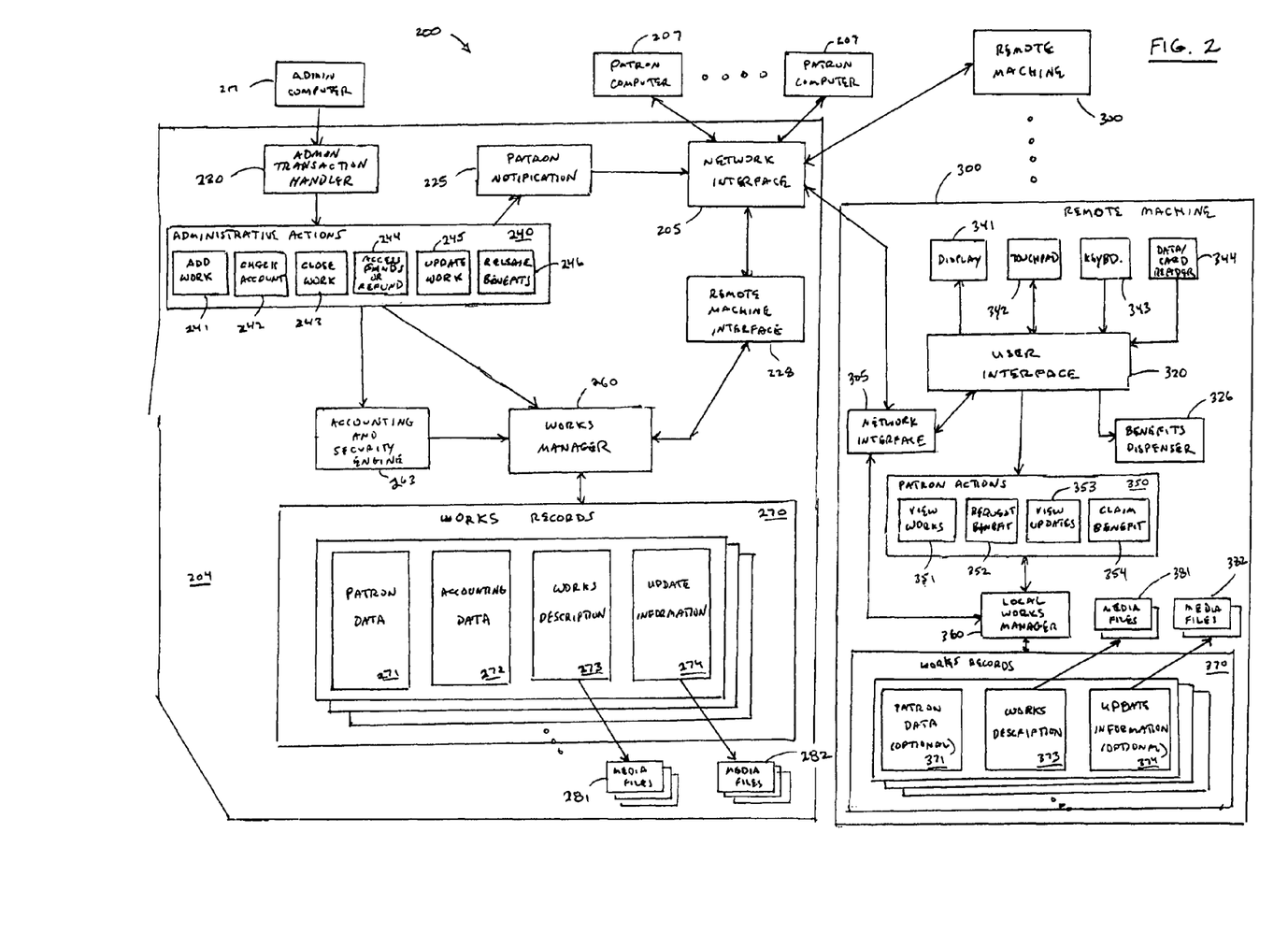
FIG. 2 is a top-level functional diagram of an alternative embodiment of a system for facilitating the creation and promotion of creative works.

Merchandise or discounts may be provided in various manners. For example, a coupon or certificate may be electronically communicated to the patron computer 107 or may, if applicable, be physically printed from a point-of-sale site, particularly in an embodiment such as illustrated in FIG. 2, described hereinafter. A printed coupon may be encoded (e.g., with a bar code or other indicia) to increase its security. Alternatively, the patron may be receive a key number which can be utilized at the time the benefit is redeemed from an online store or point-of-sale, with the key number resulting in a discount being given for the item being purchased under the benefit program. Alternatively, information relating to the benefit may be downloaded to a patron's portable data carrier (such as a smart card or e-purse), which can be carried and potentially used at point-of-sale establishments or in electronic transactions.

A centralized online redemption center may be provided which makes available for redemption, at the appropriate time, some or all of the benefits being offered via the computer system 104. A patron accessing the computer system 104 using a patron computer 107 may be routed to the centralized online redemption center in order to obtain or redeem the patron's pre-purchased benefit. The centralized online redemption center may maintain a separate centralized database of patron sponsorship of the creative works and/or be linked to the database in computer system 104. In any event the database(s) may be updated when a patron makes a redemption online or at a remote site (such as a point-of-sale redemption center) to ensure that duplicate redemption attempts are prevented.

In an alternative embodiment, illustrated in FIG. 2, a computerized system 200 is similar in many respects the computerized system 100 shown in FIG. 1, with elements having reference numbers 2xx generally corresponding in terms of functionality to elements having reference numbers 1xx in FIG. 1. The computerized system 200 shown in FIG. 2 is largely the same as that of FIG. 1 with respect to the way in which creators, system operators, or administrators add new works and generally interact with the main computer system 204. However, in the computerized system 200 of FIG. 2, the manner in which prospective patrons interact with the computer system 204 differs. In particular, prospective patrons interact by way of point-of-sale machines or computerized devices 300, hereinafter referred to as point-of-sale devices, having information stored locally, as opposed to, e.g., a personal computer with a browser.

The point-of-sale devices 300 may be embodied, for example, in the form of a kiosk or point-of-sale computer or terminal. The point-of-sale devices 300 preferably include various features for allowing interaction with prospective patrons, such as, e.g., a display 341, data/card reader 344, keyboard 343, and/or touchpad 342, or any other user-interactive feature(s). The types of patron actions 350 which may be made available to patrons at the point-of-sale devices 300 may be the same or similar to those described with respect to the FIG. 1 system, or may be a more limited subset thereof. Rather than needing to access works data records on a remote or centralized computer system, in the particular example of FIG. 2 the point-of-sale devices 300 have a local copy of the works data records 370 that may be utilized. The local works data records 370 may be managed by a local works manager 360, largely akin to works manager 260 (or 160) in functionality, and may be refreshed or updated periodically from the main computer system 204. A network interface 305 at the point-of-sale machines 300 allows them to communicate (over a distributed or other electronic network) with the main computer system 204 for this and potentially other purposes.

The point-of-sale devices 300 thus allow patrons to view information relating to works in much the same way as previously described with respect to the FIG. 1 system, taking into account the particular interactive features of the point-of-sale devices 300 which may limit or enhance the presentation of information. Patrons may request a benefit by selecting the appropriate option, and may enter their contact and/or personal information using the keyboard 343 or touchpad 342, or else using a portable data carrier (such as a smart card or magnetic stripe card) bearing such information, or some combination thereof. Depending upon the configuration of the point-of-sale machines 300, the patron may deposit cash directly into the machine 300, may perform a debit or credit transaction using a credit or debit card, make an electronic payment using, e.g., a smart card or e-purse, or cause a point-of-sale proprietor to post the transaction by utilizing any of the payment techniques made available at the point of sale.

Collected funds are processed by, transmitted to, and/or tracked by the main computer system 204, which stores such information in the accounting data 272 associated with the sponsored work.

In the FIG. 2 system, information updates associated with the works may be viewed in largely the same way as with the FIG. 1 embodiment. Notifications concerning various events, such as posting of new information or the availability of benefits, will generally be sent to the patron's personal contact address—whether an electronic or physical address—if provided. Benefits may be redeemed in ways similar to that described with respect to FIG. 1. A benefits dispenser 326 may be provided at the point-of-sale devices 300, which may comprise a ticket or coupon printer, or which may dispense actual merchandise. The point-of-sale machines 300 are preferably connected in a manner such that they may communicate with the main computer system 204 as necessary to obtain information or to allow the main computer system 204 to track activity at all of the various point-of-sale machines.

As further illustrated, in FIG. 2, the computerized system 200 may be configured so as to allow patrons utilizing patron computers 207 (e.g., personal computers, workstations, computerized handheld devices, etc.) to connect to the main computer system 204 via, e.g., network interface 205. The main computer system 204 may provide some subset of the functions associated with the patron transaction handler 120 of FIG. 1 to patrons accessing the main computer system 204 using patron computers 207. For example, the main computer system 204 may be configured to allow patrons to view information concerning a new work, to view updated information relating to an existing work under development, or to redeem, obtain, or authorize a benefit. This functionality may be in addition to that provided by the point-of-sale devices 300.

In another alternative embodiment, a computerized system may include aspects of both the systems illustrated in FIGS. 1 and 2, and thus support both online interactive patron transactions (via, e.g., a patron transaction handler 120 such as illustrated in FIG. 1) and remote patron transactions conducted on point-of-sale machines or computerized devices (e.g., kiosks or remote terminals), such as point-of-sale devices 300 illustrated in FIG. 2.

It is expected that one skilled in the art of computer programming would readily be capable of implementing the computerized system illustrated in FIGS. 1 or 2, based on the detailed functional description provided herein.

According to one or more embodiments as disclosed herein, a method is provided by which creators of works may access capital to create, publish, distribute, and/or exhibit the works. In addition, a method is provided whereby patrons, who may or may not be target audience members, may purchase a benefit related or unrelated to the work.

In certain embodiments, a creator is enabled, via an automated or semi-automated computer system, and potentially acting in concert with one or more system administrators or operators, to promote the proposed work by creating and/or posting information concerning the proposed work and making such information available to interested parties—i.e., prospective patrons—via an electronic network. In a particular example, the computer system hosts an online site and is configured to serve web pages containing information or links regarding the proposed work(s) to prospective patrons. In another example, the computer system facilitates dissemination of information relating to the work to remote electronic or mechanical devices allowing interaction with prospective patrons.

Prospective patrons achieve access to the information concerning prospective works by, e.g., entering the website, or responding to the electronic or mechanical promulgation of information. Once the website is entered, or the electronic or mechanical means are responded to, the prospective patron is informed of the works that may be considered in connection with the purchase of a benefit. If, after reviewing and evaluating the work(s), the prospective patron decides to purchase a benefit, the prospective patron indicates the purchase on-line, electronically, or mechanically, as the case may be. The patron may be given the ability to cancel an order even after indicating a purchase. After reviewing and evaluating the proposed work(s), if the prospective patron decides to purchase a benefit or to otherwise sponsor the work, the purchase may optionally be placed in a "shopping cart" to allow convenient perusal of all of the available proposed works. After reviewing other proposed works available, and, if applicable, selecting the desired one or more for sponsorship and placing them in the shopping cart, the patron may either delete items from the shopping cart or continue the transaction.

When the patron decides the purchase the benefit(s) associated with the work(s) being sponsored, the patron transmits the request to the main computer system. The request preferably identifies the patron and work, and provides a credit card account number, or other means of payment, that will be charged for the purchase. Upon receipt of the request, the automated or semi-automated computer system records all appropriate information provided by the purchaser and charges the credit or debit card account, or applies the other means of payment specified by the patron. Information about the patron is preferably incorporated in the data base at the main computer system site. The computer system may, if desired, transmit a confirmation to the patron. Using the information collected from patrons during transactions, the computer system develops a contact list that may be used to keep the patron informed of the sponsored work's progress.

The funds received from the transactions to sponsor the work, and acquire pre-purchased benefits as a result thereof, may be deposited into, e.g., an escrow account that is specifically designated to be the repository for the funds dedicated to the specific work. In the event that the work does not attract sufficient funds as the result of benefit purchases by patrons, the creator may solicit funds from conventional sources to fund the gap between accrued benefit pre-purchases and the amount needed to produce, develop, and/or market the work, or may offer the patron a benefit associated with another different work, or may refund the collected funds to the patron. When sufficient funds have accrued, they may be disbursed to the creator, preferably on an as needed basis, in order to support the work and to ensure the development, distribution, promotion, publication, and/or exhibition of the work.

During the course of the development of the work, relevant information about the work's progress may be provided to the sponsoring patrons. Such information may be available, e.g., online or otherwise. Upon the completion of the work, the patron will be notified. At that time, the patron may receive information regarding how to obtain the benefit.

A listing of the patrons for each of the creative works may be provided at a centralized location—e.g., a website or other electronically accessible computer relating to the creative works. Patrons may be allowed to opt out of, or affirmatively select to be included in the viewable listing—for example, when initially purchasing a benefit relating to the undeveloped creative work and providing contact information, or at some later point. An interactive process at the centralized website may easily accommodate this functionality. In addition, or in the alternative, a listing of the patrons may be provided with copies of the completed creative works, particularly where such works include digital data. For example, patrons may be listed in the "credits" of a movie production supported in whole or part through the purchased benefits acquired by patrons. Again, patrons may be provided a mechanism for opting out or affirmatively choosing to be part of the listing.

According to certain embodiments disclosed herein, a convenient method is provided for enabling creators of creative works to obtain funding and support as a result of pre-selling benefits (such as merchandise or discounts) in order to create and promote their works. Likewise, a convenient method is provided for prospective patrons to support the creation and promotion of creative works and obtain benefits relating thereto.

By virtue of certain systems and techniques described herein, the creators and patrons of creative works are connected and enabled to work jointly, in specified capacities, towards the creation and promotion of creative works. Independent creators of creative works without ready access to other sources of funds may, in particular, benefit from a system or method which allows patrons to support their creative works. Likewise, established production houses, studios, publishers, etc. may benefit by obtaining an alternative source of funding, in whole or part, for the creation and promotion of creative works, especially those connected with perceived risky subject matter or ventures. Certain embodiments of the disclosed system and method may therefore allow an established company to reduce its risk in supporting a project for the creation of a creative work, and, at the same time, may allow the company to establish a connection at an early stage with the intended target audience.

Consumers and patrons of creative works also benefit by having a voice in what type of creative works receive funding and support, and by being able to obtain non-public or advance information about creative works in progress. Consumers and patrons also benefit by receiving goods and services, or discounts thereon, related or unrelated to the creative works, as a result of supporting the production of the creative works.

While various embodiments have been described herein in which patrons sponsor works in order to receive a specified benefit, it is also possible that the system may be utilized to permit patrons to sponsor works without receiving a benefit in return. In such an embodiment, for example, the patron may simply desire to provide financial support to a new work for an altruistic or charitable purpose. In such a case, there would be no need to support the redemption of benefits for that particular work, although the patron may, if desired, be given special privileges to receive or access information concerning the development of the work not ordinarily available to members of the general public, in return for sponsorship of the work.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A computerized system for facilitating the creation and promotion of creative works, comprising:

a main computer configured to provide information about specific undeveloped creative works seeking financial sponsorship to remote user-interactive devices for display, said undeveloped creative works including motion picture works, wherein said information concerning the undeveloped creative works includes a plot description of at least one of the undeveloped motion picture works;

receive and process requests for purchases of benefits relating to a specific undeveloped creative work, said requests received in electronic messages transmitted over a wide area electronic network; and a non-transitory storage medium associated with said main computer configured to store patron information received from a remote user and associate the patron information with the specific undeveloped creative work selected by the user;

wherein said main computer is configured to automatically aggregate monetary amounts in a work-specific controlled escrow account, the work-specific controlled escrow account selected from among one or more work-specific controlled escrow accounts maintained on said storage medium, each work-specific controlled escrow account being identified with a different specific undeveloped creative work, for use in development of the specific undeveloped creative work, and to release all or a portion of the aggregated monies when a predefined target threshold amount is attained to facilitate completion of the specific undeveloped creative work, whereby records stored on said storage medium maintain a correlation between each work-specific controlled escrow account, the specific undeveloped creative work associated with the work-specific controlled escrow account, and the patron information associated with each specific undeveloped creative work;

to provide viewing access for the artist associated with developing the undeveloped creative work to the monetary amount in the work-specific controlled escrow account through an electronic connection from an administrative or remote computer to the main computer; and to facilitate electronic notification of patrons associated with the specific undeveloped creative work concerning availability of their purchased benefits, or upon the condition that the predefined target threshold amount is not attained, through messages transmitted over said wide area electronic network.

2. The computerized system of claim 1, wherein said main computer is configured to disseminate to user-interactive devices presentation information relating to one or more undeveloped creative works.

3. The computerized system of claim 2, wherein said main computer comprises a web server coupled to a non-transitory storage medium having stored thereon one or more web pages containing the presentation information.

4. The computerized system of claim 2, wherein said main computer comprises software instructions for executing steps whereby the presentation information is downloaded to remote computerized machines configured to allow a plurality of different potential patrons to review the presentation information.

5. The computerized system of claim 2, wherein said main computer is configured to provide software instructions to a remote patron computer, for execution on said remote patron computer, and data files comprising at least a portion of said presentation information.

6. The computerized system of claim 2, wherein said presentation information exists in static form on a printed or magnetic medium.

7. The computerized system of claim 1, wherein said main computer is configured to receive electronic payment information from the patron electronically from user-interactive devices and automatically aggregate the electronic payment information with other received funds.

8. The computerized system of claim 1, wherein said main computer is configured to collect patron information including the name of the patron and the patron's e-mail address, and associate the patron information with the undeveloped creative work and the purchased benefit.

9. The computerized system of claim 1, wherein said main computer is configured to use the patron's email address to notify the patron concerning the availability of the patron's purchased benefit or that the predefined target threshold amount was not attained.

10. The computerized system of claim 1, wherein the purchased benefit comprises a copy of or discount relating to the creative work.

11. The computerized system of claim 1, wherein the purchased benefit comprises a discount relating to merchandise or service relating to the creative work, other than the creative work itself.

12. The computerized system of claim 1, wherein the purchased benefit comprises a copy of or discount on a creative work different from the undeveloped creative work or to other merchandise or services unrelated to the undeveloped creative work.

13. The computerized system of claim 1, wherein data in the storage medium is updated to include presentation information relating to in-progress development or completion of the creative work.

14. The computerized system of claim 13, wherein the updated presentation information comprises audio, image and/or video data of the creative work.

15. The computerized system of claim 13, wherein said main computer is configured to facilitate automatic electronic notification of patrons associated with a particular undeveloped creative work concerning the updated presentation information.

16. The computerized system of claim 1, wherein the purchased benefit comprises digital data relating to the creative work, and wherein a patron may obtain the purchased benefit electronically by accessing the computerized system and requesting electronic transmission of the digital data to a patron's computer.

17. The computerized system of claim 1, wherein said main computer is configured to electronically transmit a key number to said patrons, which may be used by said patrons to redeem the purchased benefit online and/or at a point-of-sale location.

18. A computerized system for facilitating the creation and promotion of creative works, comprising:

a host computer configured to process and store information, said host computer having a non-transitory data storage medium and a network interface for connecting to a wide area electronic network;

said host computer configured to store information about specific undeveloped creative works seeking financial sponsorship, said undeveloped creative works including motion picture works, wherein said information concerning the undeveloped creative works includes a plot description of at least one of the undeveloped motion picture works;

said host computer further configured to:
provide, to remote users over the wide area electronic network, visual presentation information about specific undeveloped creative works seeking financial sponsorship, including the plot description of at least one of the undeveloped motion picture works;

receive and process requests from remote users for purchases of benefits relating to a specific undeveloped creative work;

store patron information received from a remote user and associate the patron information to the specific undeveloped creative work selected by the user;

aggregate monetary amounts in a work-specific controlled escrow account, the work-specific controlled escrow account selected from among one or more work-specific controlled escrow accounts maintained on said data storage medium each work-specific controlled escrow account identified with a different specific undeveloped creative work, for use in development of the specific undeveloped creative work, whereby records stored on said data storage medium maintain a correlation between each work-specific controlled escrow account, the specific undeveloped creative work associated with the work-specific controlled escrow account, and the patron information associated with each specific undeveloped creative work;

release all or a portion of the aggregated monies when a predefined target threshold amount is attained to facilitate completion of the specific undeveloped creative work;

provide viewing access for the artist associated with developing the undeveloped creative work to the monetary amount in the work-specific controlled escrow account through an electronic connection from an administrative or remote computer to the host computer; and electronically notify patrons associated with the specific undeveloped creative work concerning availability of their purchased benefits, or upon the condition that the predefined target threshold amount is not attained.

19. A method involving a computerized system for facilitating the creation and promotion of creative works, comprising:

providing, from a host computer to remote users over a wide area electronic network, presentation information concerning specific undeveloped creative works seeking financial sponsorship, said undeveloped creative works including motion picture works, wherein said presentation information includes a plot description of at least one of the undeveloped motion picture works;

receiving and automatically processing, by said host computer, requests from remote users for purchases of predefined benefits relating to a specific undeveloped creative work, said requests received over said wide area electronic network;

automatically storing, on said host computer, patron information received from the remote users and associating the patron information to the specific undeveloped creative work selected by the remote users;

automatically aggregating, by said host computer, monetary amounts reflected by said remote user requests in a work-specific controlled escrow account on said host computer, the work-specific controlled escrow account selected from among one or more work-specific controlled escrow accounts maintained on said host computer each work-specific controlled escrow account identified with a different specific undeveloped creative work, for use in development of the specific undeveloped creative work, whereby records stored on said host computer maintain a correlation between each work-specific controlled escrow account, the specific undeveloped creative work associated with the work-specific controlled escrow account, and the patron information associated with each specific undeveloped creative work;

releasing by said host computer all or a portion of the aggregated monies when a predefined target threshold amount is attained to facilitate completion of the specific undeveloped creative work;

providing from said host computer to an administrative or remote computer through the wide area electronic network, viewing access for the artist associated with developing the undeveloped creative work to the monetary amount in the work-specific controlled escrow account; and electronically notifying, from said host computer, patrons associated with the specific undeveloped creative work concerning availability of their purchased benefits, or upon the condition that the predefined target threshold amount is not attained, through messages transmitted over said wide area electronic network.

20. The computerized system of claim 1, said main computer providing information about the specific undeveloped creative work to a remote user-interactive device for display after receiving approval from an administrator of the main computer for the specific undeveloped creative work, wherein said approval indicates that the specific undeveloped creative work is suitable for being associated with requests for purchase of benefits relating to the specific undeveloped creative work.

21. The computerized system of claim 1, said main computer facilitating electronic notification of patrons associated with the specific undeveloped creative work after receiving authorization from a producer or creator associated with developing the specific undeveloped creative work, wherein said authorization indicates that said main computer is permitted to electronically notify patrons associated with the specific undeveloped creative work.

22. The computerized system of claim 18, said host computer providing visual presentation information about the specific undeveloped creative work to a remote user after receiving approval from an administrator of the host computer for the specific undeveloped creative work, wherein said approval indicates that the specific undeveloped creative work is suitable for being associated with requests for purchase of benefits relating to the specific undeveloped creative work.

23. The computerized system of claim 18, said host computer electronically notifying patrons associated with the specific undeveloped creative work after receiving authorization from a producer or creator associated with developing the specific undeveloped creative work, wherein said authorization indicates that said host computer is permitted to electronically notify patrons associated with the specific undeveloped creative work.

24. The method of claim 19, further comprising receiving, by said host computer and prior to said providing presentation information concerning a specific undeveloped creative work, approval from an administrator of said host computer for said specific undeveloped creative work, wherein said approval indicates that said specific undeveloped creative work is suitable for being associated with requests for purchases of predefined benefits relating to the specific undeveloped creative work.

25. The method of claim 19, further comprising receiving, by said host computer and prior to electronically notifying patrons associated with a specific undeveloped creative work, authorization from a producer or creator associated with developing said specific undeveloped creative work, said authorization indicating that said host computer is permitted to electronically notify patrons associated with the specific undeveloped creative work.

26. The computerized system of claim 1, wherein the undeveloped creative work is a motion picture, and wherein patrons who contributed funding for the motion picture are listed in the credits in distributed copies of the completed motion picture.

* * * * *